United States Patent
Noh et al.

(10) Patent No.: US 9,993,774 B2
(45) Date of Patent: Jun. 12, 2018

(54) FILTRATION SYSTEM AND FILTRATION METHOD

(71) Applicant: KOLON INDUSTRIES, INC., Gwacheon-si, Gyeonggi-do (KR)

(72) Inventors: Jung Min Noh, Yongin-si (KR); Heewan Moon, Yongin-si (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 340 days.

(21) Appl. No.: 14/895,235

(22) PCT Filed: May 28, 2014

(86) PCT No.: PCT/KR2014/004725
§ 371 (c)(1),
(2) Date: Dec. 2, 2015

(87) PCT Pub. No.: WO2014/200210
PCT Pub. Date: Dec. 18, 2014

(65) Prior Publication Data
US 2016/0121269 A1    May 5, 2016

(30) Foreign Application Priority Data

Jun. 10, 2013  (KR) .......................... 10-2013-0065928

(51) Int. Cl.
*B01D 61/58* (2006.01)
*B01D 61/04* (2006.01)
(Continued)

(52) U.S. Cl.
CPC ............. *B01D 61/58* (2013.01); *B01D 61/04* (2013.01); *B01D 61/08* (2013.01); *B01D 61/12* (2013.01);
(Continued)

(58) Field of Classification Search
CPC ........ B01D 2311/16; B01D 2311/2649; B01D 2313/243; B01D 2315/06; B01D 2315/20;
(Continued)

(56) References Cited

FOREIGN PATENT DOCUMENTS

| JP | 06-023245 A | 2/1994 |
|---|---|---|
| JP | 2002-346348 A | 12/2002 |

(Continued)

OTHER PUBLICATIONS

English translation Japanese Patent Application No. 06-023245 A (Feb. 1994).*

(Continued)

*Primary Examiner* — John Kim
(74) *Attorney, Agent, or Firm* — Sughrue Mion, PLLC

(57) ABSTRACT

Disclosed are system and method for filtration capable of minimizing the damage of a filtration membrane module, reducing the energy consumption, and improving the filtration efficiency. The filtration method of the invention comprises performing a preliminary filtration of a feed water with first and second submerged-type filtration membrane modules; pressurizing an initial filtrate produced through the preliminary filtration with a pressure higher than an osmotic pressure of the feed water; filtering the pressurized initial filtrate with a reverse osmosis membrane module; interrupting the first submerged-type filtration membrane module performing the preliminary filtration; and backwashing the first submerged-type filtration membrane module caused to stop performing the preliminary filtration, wherein the preliminary filtration with the second submerged-type filtration membrane module is continuously performed while the first submerged-type filtration membrane module is backwashed.

15 Claims, 4 Drawing Sheets

(51) Int. Cl.
  *B01D 61/08*   (2006.01)
  *B01D 61/12*   (2006.01)
  *B01D 65/02*   (2006.01)
(52) U.S. Cl.
  CPC .......... *B01D 65/02* (2013.01); *B01D 2311/16* (2013.01); *B01D 2311/2649* (2013.01); *B01D 2313/243* (2013.01); *B01D 2315/06* (2013.01); *B01D 2315/20* (2013.01); *B01D 2317/025* (2013.01); *B01D 2317/04* (2013.01); *B01D 2321/04* (2013.01)
(58) Field of Classification Search
  CPC .......... B01D 2317/025; B01D 2317/04; B01D 2321/04; B01D 61/04; B01D 61/12; B01D 65/02; B01D 61/08; B01D 61/58
  See application file for complete search history.

(56) References Cited

FOREIGN PATENT DOCUMENTS

| | | |
|---|---|---|
| JP | 2004-074081 A | 3/2004 |
| JP | 2010-247120 A | 11/2010 |
| KR | 10-2013-0016865 A | 2/2013 |

OTHER PUBLICATIONS

English translation Japanese Patent Application No. 2010-247120 A (Nov. 2010).*
International Searching Authority, International Search Report of PCT/KR2014/004725 dated Sep. 17, 2014 [PCT/ISA/210].

* cited by examiner

FILTRATION SYSTEM AND FILTRATION METHOD

CROSS REFERENCE TO RELATED APPLICATIONS

This application is a National Stage of International Application No. PCT/KR2014/004725, filed May 28, 2014, claiming priority based on Korean Patent Application No. 10-2013-0065928, filed Jun. 10, 2013, the contents of all of which are incorporated herein by reference in their entirety.

TECHNICAL FIELD

The present invention relates to system and method for filtration, and more particularly, to system and method for filtration capable of minimizing the damage of a filtration membrane module, reducing the energy consumption, and improving the filtration efficiency.

BACKGROUND ART

It has been proved that a filtration with a reverse osmosis membrane which has been applied to various fields of water treatment including seawater desalination is superior to the filtrations with other membranes in terms of separation performance.

Referring to FIG. 1 and FIG. 2, a filtration with a reverse osmosis membrane is described below.

FIG. 1 and FIG. 2 are block diagrams respectively showing a filtration system using a reverse osmosis membrane.

As shown in FIG. 1, a preliminary filtration with a pressurized-type filtration membrane module 10 for MF (microfiltration) or UF (ultrafiltration) is generally performed before a filtration with a reverse osmosis membrane is performed. That is, the feed water (or pre-treated water produced through sand filtration) pressurized by the first pump P1 is filtered with the pressurized-type filtration membrane module 10.

The initial filtrate produced through the preliminary filtration is stored in the water tank 20.

Then, the initial filtrate stored in the water tank 20 is forwarded to the second pump P2 by the pressurizing pump P3, pressurized with a pressure higher than the osmotic pressure by the second pump P2, and then filtered by the reverse osmosis membrane module 30. The ions and molecules in the initial filtrate cannot pass through the reverse osmosis membrane, and only pure water passes through the reverse osmosis membrane.

Since the feed water (or pre-treated water) such as seawater is filtered by the reverse osmosis membrane module 30 after the solids therein is removed by the pressurized-type filtration membrane module 10, the reverse osmosis membrane in the reverse osmosis membrane module 30 can be prevented from being damaged due to the solids.

However, a considerable amount of energy is required for the second pump P2 to pressurize the initial filtrate from the water tank 20 with the pressure higher than the osmotic pressure. For this reason, the filtration system illustrated in FIG. 2 was suggested to reduce the energy consumption.

According to the filtration system illustrated in FIG. 2, there is no water tank 20 between the pressurized-type filtration membrane module 10 and reverse osmosis membrane module 30. Instead, the feed water (or pre-treated water) to be introduced into the pressurized-type filtration membrane module 10 is pressurized with much higher pressure so that the initial filtrate produced by the pressurized-type filtration membrane module 10 can be discharged from the pressurized-type filtration membrane module 10 in a pressurized state. Since the initial filtrate produced by the pressurized-type filtration membrane module 10 is in a pressurized state in some degree, relatively small energy is required to pressurize the initial filtrate with a pressure higher than the osmotic pressure if the initial filtrate is directly pressurized by the second pump P2 without being stored in the water tank 20. This is called "direct feed" or "tankless feed."

However, the filtration system illustrated in FIG. 2 has the following drawbacks.

First, since the "direct feed" filtration system illustrated in FIG. 2 requires the feed water (or pre-treated water) to be pressurized with higher pressure than the filtration system illustrated in FIG. 1, the risk of damage of the filtration membrane in the pressurized-type filtration membrane module 10 increases.

Second, since the filtration membrane of the pressurized-type filtration membrane module 10 is contaminated as the preliminary filtration is performed, it is necessary to clean the filtration membrane of the pressurized-type filtration membrane module 10 by performing a backwash periodically. The reverse osmosis membrane module 30 has to be stopped during the backwash process, which is detrimental to the filtration efficiency. Furthermore, after the backwash process, lots of energy is consumed to restart the first and second pumps P1 and P2 which were shut down during the backwash process, because lots of energy is required to restart a stopped pump.

DISCLOSURE

Technical Problem

Therefore, the present invention is directed to system and method for filtration capable of preventing these limitations and drawbacks of the related art.

An aspect of the present invention is to provide a filtration system comprising a reverse osmosis membrane, which is capable of minimizing the damage of a filtration membrane module, reducing the energy consumption, and improving the filtration efficiency.

The other aspect of the present invention is to provide a filtration method using a reverse osmosis membrane, which is capable of minimizing the damage of a filtration membrane module, reducing the energy consumption, and improving the filtration efficiency.

Additional aspects and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims.

Technical Solution

In accordance with the aspect of the present invention, there is provided a filtration system comprising: first and second submerged-type filtration membrane modules; a common suction pump configured to supply a negative pressure to the first and second submerged-type filtration membrane modules; first and second backwash pipes configured to supply backwash water to the first and second submerged-type filtration membrane modules; a high pressure pump configured to pressurize an initial filtrate with a pressure higher than an osmotic pressure of a feed water, the initial filtrate produced from the feed water by the first and second submerged-type filtration membrane modules; a reverse osmosis membrane module configured to filter the initial filtrate pressurized by the high pressure pump; a first valve configured to selectively connect the first submerged-type filtration membrane module to one of the common suction pump and the first backwash pipe; and a second valve configured to selectively connect the second submerged-type filtration membrane module to one of the common suction pump and the second backwash pipe.

In accordance with the other aspect of the present invention, there is provided a filtration method comprising: performing a preliminary filtration of a feed water with first and second submerged-type filtration membrane modules; pressurizing an initial filtrate produced through the preliminary filtration with a pressure higher than an osmotic pressure of the feed water; filtering the pressurized initial filtrate with a reverse osmosis membrane module; interrupting the first submerged-type filtration membrane module performing the preliminary filtration; and backwashing the first submerged-type filtration membrane module caused to stop performing the preliminary filtration, wherein the preliminary filtration with the second submerged-type filtration membrane module is continuously performed while the first submerged-type filtration membrane module is backwashed.

It is to be understood that both the foregoing general description and the following detailed description of the present invention are exemplary and explanatory and are intended to provide further explanation of the invention as claimed.

Advantageous Effect

According to one embodiment of the present invention, before the filtration process is performed by a reverse osmosis membrane module, the preliminary filtration is performed by a submerged-type filtration membrane module rather than by a pressurized-type filtration membrane module. Thus, even if high negative pressure is applied to the filtration membrane so as to discharge an initial filtration of pressurized state, the risk of damage of the filtration membrane can be remarkably reduced compared to the case where a pressurized-type filtration membrane module is used.

Additionally, according to one embodiment of the present invention, a plurality of submerged-type filtration membrane modules can perform the filtration process independently from each other to supply the initial filtrate to the reverse osmosis membrane module and can be backwashed independently from each other as well. Thus, while one submerged-type filtration membrane module is backwashed, the initial filtrate can be continuously supplied to the reverse osmosis membrane module by the other submerged-type filtration membrane modules. Consequently, the reverse osmosis membrane module can continuously perform the filtration process without being interrupted, thereby improving the filtration efficiency.

Furthermore, while the entire filtration process is performed, all the pumps in the filtration system according to one embodiment of the present invention continuously operate without being interrupted. Hence, the considerable energy consumption necessary to restart a stopped pump can be prevented.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR INVENTION

Figure 1:
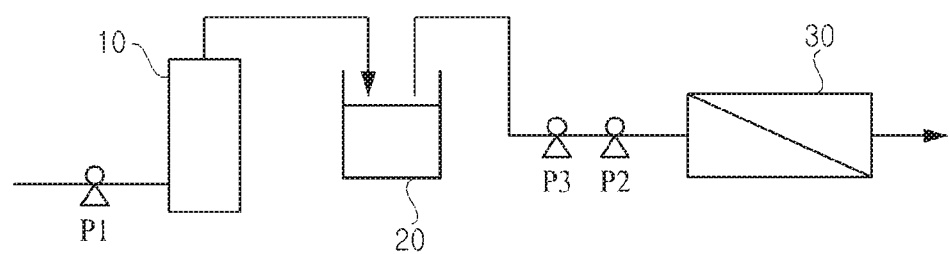
FIG. 1 is a block diagram showing an example of a filtration system using a reverse osmosis membrane.
Figure 2:
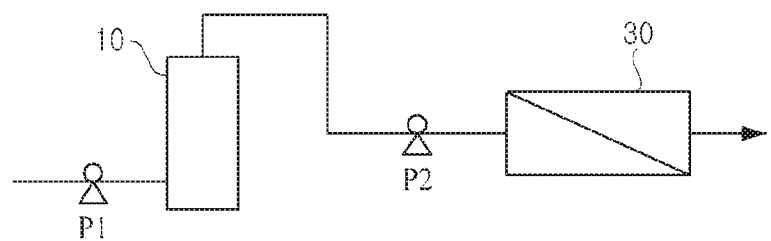
FIG. 2 is a block diagram showing another example of a filtration system using a reverse osmosis membrane.

Hereinafter, the systems and methods for filtration according to the embodiments of the present invention will be described in detail with reference to the annexed drawings. As far as it is possible, the same reference numeral will be used for the same or identical parts.

In this specification, "A is connected to B" means that A is in fluid communication with B.

Figure 3:
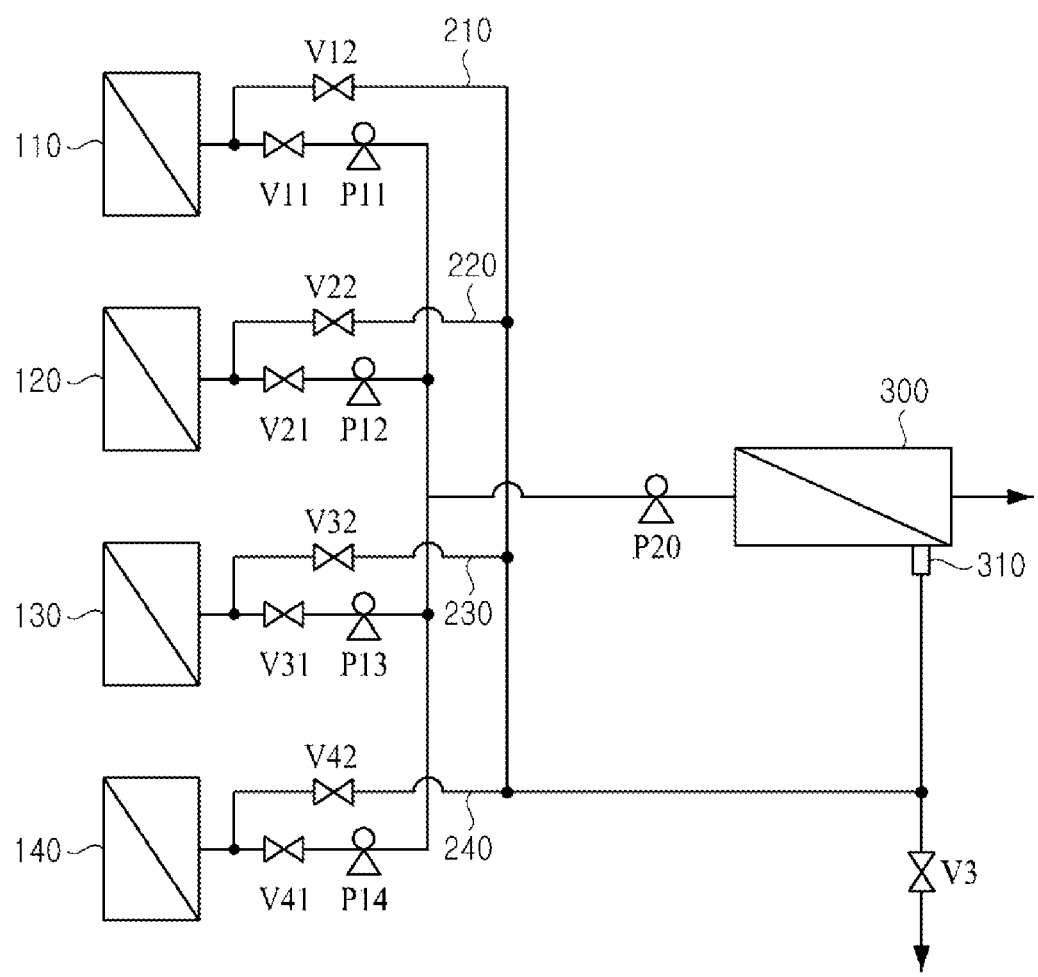
FIG. 3 is a block diagram schematically showing a filtration system according to one embodiment of the present invention.

FIG. 3 is a block diagram schematically showing a filtration system according to one embodiment of the present invention.

As illustrated in FIG. 3, a filtration system according to one embodiment of the present invention comprises first to fourth submerged-type filtration membrane modules 110, 120, 130, and 140, first to fourth suction pumps P11, P12, P12, and P14 configured to supply negative pressure to the modules 110, 120, 130, and 140 respectively, first to fourth backwash pipes 210, 220, 230, and 240 configured to supply backwash water to the modules 110, 120, 130, and 140, a high pressure pump P20 configured to pressurize an initial filtrate produced by the modules 110, 120, 130, and 140 with a pressure higher than an osmotic pressure, and a reverse osmosis membrane module 300 configured to filter the initial filtrate pressurized by the high pressure pump P20.

The osmotic pressure refers to the osmotic pressure of the feed water to be treated. If the feed water to be treated is seawater, the osmotic pressure will be about 24.5 kg/cm$^2$.

As explained above, the first to fourth submerged-type filtration membrane modules 110, 120, 130, and 140 may perform the preliminary filtration process within a common treatment tank (not shown). Alternatively, the first to fourth submerged-type filtration membrane modules 110, 120, 130, and 140 may perform the preliminary filtration process respectively in the separate treatment tanks (not shown). The first to fourth submerged-type filtration membrane modules 110, 120, 130, and 140 may constitute separate filtration units (e.g., cassettes or skids) respectively.

The reverse osmosis membrane module 300 may comprise a condensed water outlet 310 configured to discharge a condensed water produced as the filtration of the initial filtrate is performed.

Although the condensed water discharged through the condensed water outlet 310 contains the ions and/or molecules which could not pass through the reverse osmosis membrane, the entire condensed water can pass through the filtration membranes of the first to fourth submerged-type filtration membrane modules 110, 120, 130, and 140 because it is originated from the initial filtrate produced by the modules 110, 120, 130, and 140. Accordingly, the condensed water discharged through the condensed water outlet 310 can be exploited as a backwash water for the first to fourth submerged-type filtration membrane modules 110, 120, 130, and 140.

Hence, according to the embodiment of the present invention illustrated in FIG. 3, the condensed water outlet 310 of the reverse osmosis membrane module 300 is connected to the first to fourth backwash pipes 210, 220, 230, and 240 so that the condensed water discharged through the condensed water outlet 310 can be supplied to the first to fourth backwash pipes 210, 220, 230, and 240 respectively as a backwash water. However, when all the first to fourth submerged-type filtration membrane modules 110, 120, 130, and 140 perform the preliminary filtration (i.e., any backwash process is not performed), the valve V3 is controlled so as to drain the condensed water. That is, the flow direction of the condensed water is determined by controlling the valve V3.

The filtration system further comprises the valves V11, V21, V31, and V41 for selectively connecting the first to fourth submerged-type filtration membrane modules 110, 120, 130, and 140 to the first to fourth suction pumps P11, P12, P13, and P14 respectively, and the valves V12, V22, V32, and V42 for selectively connecting the first to fourth submerged-type filtration membrane modules 110, 120, 130, and 140 to the first to fourth backwash pipes 210, 220, 230, and 240 respectively.

Although not shown, the filtration system illustrated in FIG. 3 further comprises a control unit configured to control the valves and pumps.

When a normal filtration process is carried on, the control unit manipulates the valves V11, V21, V31, and V41 in such a manner that the first to fourth submerged-type filtration membrane modules 110, 120, 130, and 140 are connected to the first to fourth suction pumps P11, P12, P13, and P14 respectively, and, at the same time, manipulates the valves V12, V22, V32, and V42 in such a manner that the first to fourth submerged-type filtration membrane modules 110, 120, 130, and 140 are not connected to the first to fourth backwash pipes 210, 220, 230, and 240. Additionally, the valve V3 is controlled by the control unit so as to drain the condensed water produced by the reverse osmosis membrane module 300.

On the other hand, when a backwash process for one of the first to fourth submerged-type filtration membrane modules 110, 120, 130, and 140 is carried on, the control unit manipulates the valve V3 so as to supply the condensed water toward the first to fourth backwash pipes 210, 220, 230, and 240, and, at the same time, manipulates the valves corresponding to the submerged-type filtration membrane module which is to be backwashed so as to disconnect it from the corresponding suction pump and connect it to the corresponding backwash pipe. At this time, the operation of the suction pump disconnected from the module is stopped. For example, when the first submerged-type filtration membrane module 110 is backwashed, the control unit controls the valve V12 so as to connect the first submerged-type filtration membrane module 110 to the first backwash pipe 210, controls the valve V11 so as to disconnect the first submerged-type filtration membrane module 110 from the first suction pump P11, and stops the first suction pump P11.

According to one embodiment of the present invention illustrated in FIG. 3, before the filtration process is performed by the reverse osmosis membrane module 300, the preliminary filtration is performed by the submerged-type filtration membrane modules 110, 120, 130, and 140 rather than by a pressurized-type filtration membrane module. Thus, the risk of damage of the filtration membrane can be remarkably reduced compared to the case where a pressurized-type filtration membrane module is used.

Additionally, since a plurality of submerged-type filtration membrane modules 110, 120, 130, and 140 can perform the filtration process independently from each other to supply the initial filtrate to the reverse osmosis membrane module 300 and can be backwashed independently from each other as well, even when one submerged-type filtration membrane module is backwashed, the initial filtrate can be continuously supplied to the reverse osmosis membrane module 300 by the other submerged-type filtration membrane modules. Consequently, the reverse osmosis membrane module 300 can continuously perform the filtration process without being interrupted, thereby improving the filtration efficiency.

However, the filtration system according to one embodiment of the present invention illustrated in FIG. 3 has the drawbacks as follows.

First, the filtration system requires too many valves and pumps, which complicates the installation and control thereof.

Second, since each of the first to fourth suction pumps P11, P12, P13, P14 has to be stopped whenever its corresponding submerged-type filtration membrane module is backwashed and, after the backwash process, has to be restarted, considerable energy consumption is required.

Hereinafter, the other embodiments of the present invention which can overcome the aforementioned problems will be described in detail with reference to FIG. 4 and FIG. 5.

Figure 4:
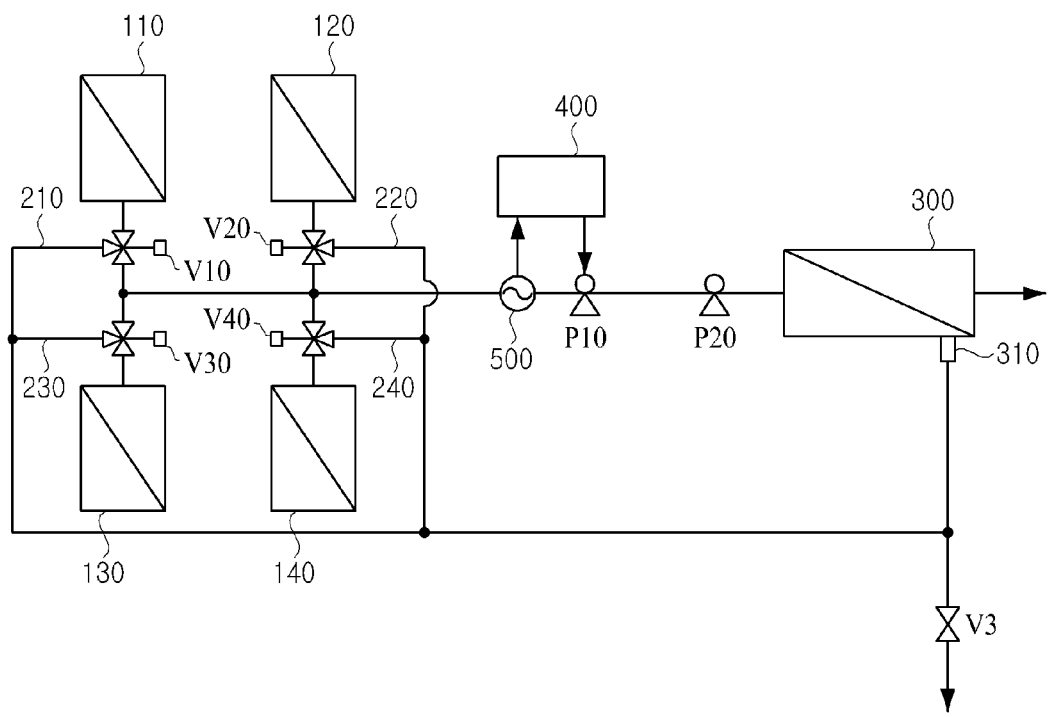
FIG. 4 is a block diagram schematically showing a filtration system according to another embodiment of the present invention.

FIG. 4 is a block diagram schematically showing a filtration system according to another embodiment of the present invention.

Just like FIG. 3, FIG. 4 illustrates a filtration system comprising 4 submerged-type filtration membrane modules. However, the technical features as applied to the embodiments described below can also be applied to other filtration systems as far as they has plural submerged-type filtration membrane modules, regardless of the number thereof.

As illustrated in FIG. 4, the filtration system comprises the first to fourth submerged-type filtration membrane modules 110, 120, 130, and 140, a common suction pump P10 configured to supply negative pressure to the modules 110, 120, 130, and 140, the first to fourth backwash pipes 210, 220, 230, and 240 configured to supply backwash water to the modules 110, 120, 130, and 140 respectively, a high pressure pump P20 configured to pressurize an initial filtrate produced by the modules 110, 120, 130, and 140 with a pressure higher than an osmosis pressure, and a reverse osmosis membrane module 300 configured to filter the initial filtrate pressurized by the high pressure pump P20.

The osmotic pressure refers to the osmotic pressure of the feed water to be treated. If the feed water to be treated is seawater, the osmotic pressure will be about 24.5 kg/cm$^2$.

The filtration system further comprises the first valve V10 for selectively connecting the first submerged-type filtration membrane module 110 to one of the common suction pump P10 and the first backwash pipe 210, the second valve V20 for selectively connecting the second submerged-type filtration membrane module 120 to one of the common suction pump P10 and the second backwash pipe 220, the third valve V30 for selectively connecting the third submerged-type filtration membrane module 130 to one of the common suction pump P10 and the third backwash pipe 230, and the fourth valve V40 for selectively connecting the fourth submerged-type filtration membrane module 140 to one of the common suction pump P10 and the fourth backwash pipe 240.

The first to fourth valves V10, V20, V30, and V40 may be, for example, 3-way valves.

As described above, the first to fourth submerged-type filtration membrane modules 110, 120, 130, and 140 may perform the preliminary filtration within a common treatment tank (not shown). Alternatively, the first to fourth submerged-type filtration membrane modules 110, 120, 130, and 140 may perform the preliminary filtration process in the separate treatment tanks (not shown), respectively. The first to fourth submerged-type filtration membrane modules 110, 120, 130, and 140 may constitute separate filtration units (e.g., cassettes or skids) respectively.

As illustrated in FIG. 4, the reverse osmosis membrane module 300 may comprise a condensed water outlet 310 configured to discharge a condensed water produced as the filtration of the initial filtrate is performed.

Although the condensed water discharged through the condensed water outlet 310 contains the ions and/or molecules which could not pass through the reverse osmosis membrane, the entire condensed water can pass through the filtration membranes of the first to fourth submerged-type filtration membrane modules 110, 120, 130, and 140 because it is originated from the initial filtrate produced by the modules 110, 120, 130, and 140. Accordingly, the condensed water discharged through the condensed water outlet 310 can be exploited as a backwash water for the first to fourth submerged-type filtration membrane modules 110, 120, 130, and 140.

Hence, according to the embodiment of the present invention illustrated in FIG. 4, the condensed water outlet 310 of the reverse osmosis membrane module 300 is connected to the first to fourth backwash pipes 210, 220, 230, and 240 so that the condensed water discharged through the condensed water outlet 310 can be supplied to the first to fourth backwash pipes 210, 220, 230, and 240 respectively as a backwash water. However, when all the first to fourth submerged-type filtration membrane modules 110, 120, 130, and 140 perform the preliminary filtration (i.e., any backwash process is not performed), the valve V3 is controlled so as to drain the condensed water. That is, the flow direction of the condensed water is determined by controlling the valve V3.

The filtration system further comprises a control unit 400 configured to control the common suction pump P10 in such a manner that the flux of the initial filtrate to be pressurized by the high pressure pump P20 can be maintained constant.

The control unit 400 controls the first to fourth valves V10, V20, V30, and V40, the common suction pump P10, and the high pressure pump P20 of the filtration system.

For example, when one of the first to fourth submerged-type filtration membrane modules 110, 120, 130, and 140 is backwashed, the control unit 400 may increase the operation pressure of the common suction pump P10 so that the interruption of the preliminary filtration of the module does not cause the decrease of the amount of the initial filtrate flowing to the high pressure pump P20 through the common suction pump P10.

To facilitate the aforementioned constant flux control, the filtration system may further comprise a flowmeter 500 configured to measure the flux of the initial filtrate to be pressurized by the high pressure pump P20 and supply the measured flux to the control unit 400. The flowmeter 500 may be located right before the common suction pump P10 or between the common suction pump P10 and high pressure pump P20.

When a normal filtration process is carried on, the control unit 400 manipulates the valves V10, V20, V30, and V40 in such a manner that the first to fourth submerged-type filtration membrane modules 110, 120, 130, and 140 are connected only to the common suction pump P10.

On the other hand, when a backwash process for one of the first to fourth submerged-type filtration membrane modules 110, 120, 130, and 140 is carried on, the control unit 400 manipulates the valve V3 so as to supply the condensed water toward the first to fourth backwash pipes 210, 220, 230, and 240, and, at the same time, manipulates the valve corresponding to the submerged-type filtration membrane module which is to be backwashed so as to connect it to the corresponding backwash pipe. At this time, the common suction pipe P10 continuously supplies the negative pressure to the rest of the modules.

For example, when the first submerged-type filtration membrane module 110 is backwashed, the control unit 400 controls the valve V10 so as to selectively connect the first submerged-type filtration membrane module 110 to the first backwash pipe 210, thereby introducing the condensed water of high pressure discharged from the reverse osmosis membrane module 300 through the condensed water outlet 310 into the first submerged-type filtration membrane module 110 to perform the backwash.

At this time, the common suction pump P10 is selectively connected to the second to fourth submerged-type filtration membrane modules 120, 130, and 140 through the second to fourth valves V20, V30, and V40 and continuously supplies the negative pressure thereto for the preliminary filtration. As explained above, the control unit 400 may increase the operation pressure of the common suction pump P10 for the constant flux control.

When one of the first to fourth submerged-type filtration membrane modules 110, 120, 130, and 140 is backwashed, the embodiment illustrated in FIG. 3 stops the operation of the corresponding suction pump which is disconnected from the module which is backwashed. On the contrary, the embodiment illustrated in FIG. 4 does not stop the operation of the common suction pump P10 even when a module is backwashed. According to the embodiment illustrated in FIG. 4, the amount of energy required to restart a shutdown pump can be saved.

Hereinafter, the filtration method using the filtration system illustrated in FIG. 4 will be described in detail.

First, as the negative pressure is supplied by the common suction pump P10 to the first to fourth submerged-type filtration membrane modules 110, 120, 130, and 140, the preliminary filtration of the feed water (or pre-treated water produced through sand filtration) to be treated is performed by the first to fourth submerged-type filtration membrane modules 110, 120, 130, and 140. At this time, the first to fourth submerged-type filtration membrane modules 110, 120, 130, and 140 are selectively connected to the common suction pump P10 through the first to fourth valves V10, V20, V30, and V40 respectively.

The initial filtrate produced through the preliminary filtration is pressurized by the high pressure pump P20 with a pressure higher than the osmotic pressure.

The initial filtrate pressurized by the high pressure pump P20 is filtered with the reverse osmosis membrane module 300, and the condensed water produced as the filtration is performed is drained.

Then, the preliminary filtration by the first submerged-type filtration membrane module 110 is stopped by manipulating the first valve V10 in such a manner that the first submerged-type filtration membrane module 110 is connected to the first backwash pipe 210, and the condensed water is supplied to the first submerged-type filtration membrane module 110 through the first backwash pipe 210 so that the backwash process begins.

At this time, the second to fourth submerged-type filtration membrane modules 120, 130, and 140 are selectively connected to the common suction pump P10 through the second to fourth valves V20, V30, and V40 respectively, and thus supplied with the negative pressure therefrom. Accordingly, the preliminary filtration by the second to fourth submerged-type filtration membrane modules 120, 130, and 140 is continuously performed while the first submerged-type filtration membrane module 110 is backwashed.

According to the embodiment illustrated in FIG. 4, since the condensed water outlet 310 of the reverse osmosis membrane module 300 is connected to the first backwash pipe 210, the condensed water produced during the filtration by the reverse osmosis membrane module 300 is used for the backwash of the first submerged-type filtration membrane module 110.

According to the embodiment illustrated in FIG. 4, the filtration method further comprises adjusting a flux of the initial filtrate in such a manner that the flux of the initial filtrate to be pressurized by the high pressure pump P20 can be maintained constant.

For more detailed description, the operation pressure of the common suction pump P10 is increased by the control unit 400 during the backwash process so that the flux of the initial filtrate produced by the second to fourth submerged-type filtration membrane modules 120, 130, and 140 during the backwash of the first submerged-type filtration membrane module 110 does not become smaller than the flux of the initial filtrate simultaneously produced by the first to fourth submerged-type filtration membrane modules 110, 120, 130, and 140.

Optionally, the filtration method may further comprise, before adjusting the flux of the initial filtrate, measuring the flux of the initial filtrate to be pressurized by the high pressure pump P20 with the pressure higher than the osmotic pressure.

As described above, according to the embodiment of the present invention illustrated in FIG. 4, before the filtration process is performed by the reverse osmosis membrane module 300, the preliminary filtration is performed by the submerged-type filtration membrane modules 110, 120, 130, and 140 rather than by a pressurized-type filtration membrane module. Thus, the risk of damage of the filtration membrane can be remarkably reduced compared to the case where a pressurized-type filtration membrane module is used.

Additionally, since a plurality of submerged-type filtration membrane modules 110, 120, 130, and 140 can perform the filtration process independently from each other to supply the initial filtrate to the reverse osmosis membrane module 300 and can be backwashed independently from each other as well, even when one submerged-type filtration membrane module is backwashed, the initial filtrate can be continuously supplied to the reverse osmosis membrane module 300 by the other submerged-type filtration membrane modules. Consequently, the reverse osmosis membrane module 300 can continuously perform the filtration process without being interrupted, thereby improving the filtration efficiency.

Furthermore, the number of the valves and pumps used in the filtration system can be minimized, and, since all the pumps P10 and P20 included in the filtration system continuously operate without being interrupted during the filtration process, excessive energy consumption necessary to restart a stopped pump can be avoided.

Hereinafter, referring to FIG. 5, still another embodiment of the present invention will be described in detail. FIG. 5 is a block diagram schematically showing a filtration system according to still another embodiment of the present invention.

Figure 5:
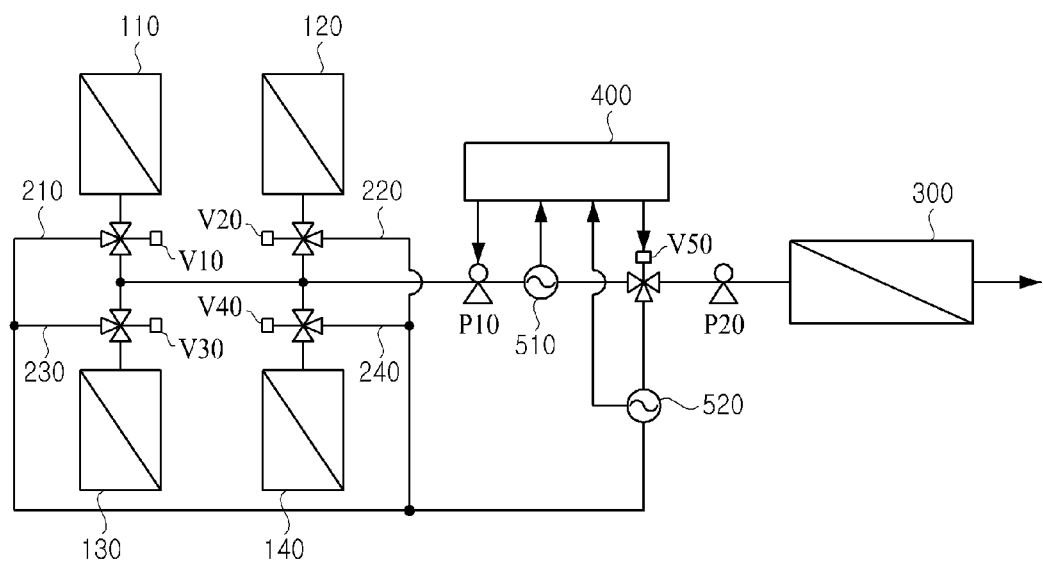
FIG. 5 is a block diagram schematically showing a filtration system according to still another embodiment of the present invention.

The filtration system illustrated in FIG. 5 is different from the filtration system illustrated in FIG. 4 in that a portion of the initial filtrate produced by the first to fourth submerged-type filtration membrane modules 110, 120, 130, and 140 rather than the condensed water produced by the reverse osmosis membrane module 300 is used as a backwash water which is supplied to the first to fourth submerged-type filtration membrane modules 110, 120, 130, and 140 through the first to fourth backwash pipes 210, 220, 230, and 240.

That is, according to the filtration system illustrated in FIG. 5, the condensed water produced by the reverse osmosis membrane module 300 is not supplied to the first to fourth backwash pipes 210, 220, 230, and 240. Instead, the filtration system illustrated in FIG. 5 further comprises a flux distributing valve V50 configured to supply a portion of the initial filtrate produced by the first to fourth submerged-type filtration membrane modules 110, 120, 130, and 140 to the first to fourth backwash pipes 210, 220, 230, and 240, and supply a rest of the initial filtrate to the high pressure pump P20.

The filtration system illustrated in FIG. 5 also may further comprise the first and second flowmeters 510 and 520 configured to measure the flux of the initial filtrate to be pressurized by the high pressure pump P20 and then supply the measured flux to the control unit 400.

The first and second flowmeters 510 and 520 for the constant flux control respectively measure two of the entire flux of the initial filtrate supplied by the common suction pump P10, the flux of the initial filtrate supplied to the reverse osmosis membrane module 300, and the flux of the initial filtrate supplied to the backwash pipes 210, 220, 230, and 240, and then supply the measured value to the control unit 400. For example, as shown in FIG. 5, the first and second flowmeters 510 and 520 may measure the entire flux of the initial filtrate supplied by the common suction pump P10 and the flux of the initial filtrate supplied to the backwash pipes 210, 220, 230, and 240, respectively.

For instance, when the first submerged-type filtration membrane module 110 is backwashed, the control unit 400 controls the valve V10 so as to selectively connect the first submerged-type filtration membrane module 110 to the first backwash pipe 210 and, at the same time, controls the flux distributing valve V50 so as to introduce a portion of the initial filtrate produce by the second to fourth submerged-type filtration membrane modules 120, 130, and 140 into the first submerged-type filtration membrane module 110 through the first backwash pipe 210, thereby performing the backwash.

At this time, the common suction pump P10 is selectively connected to the second to fourth submerged-type filtration membrane modules 120, 130, and 140 through the second to fourth valves V20, V30, and V40 and continuously supplies the negative pressure thereto for the preliminary filtration.

As explained above, the control unit 400 may increase the operation pressure of the common suction pump P10 for the constant flux control. Additionally, the control unit 400 may manipulate the flux distributing valve V50 to adjust the amount of the initial filtrate supplied to the high pressure pump P20.

Consequently, according to the filtration system illustrated in FIG. 5, a portion of the initial filtrate produced by the second to fourth submerged-type filtration membrane modules 120, 130, and 140 is used for backwash of the first submerged-type filtration membrane module 110. Further, just like the embodiment illustrated in FIG. 4, since the common suction pump P10 is not interrupted even when one of the plural modules is backwashed, the excessive energy consumption required to restart a shutdown pump can be avoided.

Although the present invention is described above by means of the filtration systems which perform the preliminary filtration using 4 (four) submerged-type filtration membrane modules, the present invention is not limited thereto and the scope of the present invention should be construed to encompass any filtration system (e.g., a filtration system having more than 4 submerged-type filtration membrane modules) as far as it comprises a plurality of submerged-type filtration membrane modules, regardless of the number thereof.

Likewise, although the present invention is described above by means of the filtration systems comprising one reverse osmosis membrane module, the present invention is not limited thereto and a filtration system of the present invention may comprise a plurality of reverse osmosis membrane modules. For example, in case of a filtration system comprising 3 (three) reverse osmosis membrane modules, the condensed water discharged from the first reverse osmosis membrane module filtering the initial filtrate produced by the submerged-type filtration membrane modules may be introduced into the neighboring second reverse osmosis membrane module and filtered thereby, the condensed water discharged from the second reverse osmosis membrane module may be introduced into the third reverse osmosis membrane module and filtered thereby, and the condensed water discharged from the third reverse osmosis membrane module may be used for backwash of the submerged-type filtration membrane modules.

The invention claimed is:

1. A filtration system comprising:
    first and second submerged-type filtration membrane modules;
    a common suction pump configured to supply a negative pressure to the first and second submerged-type filtration membrane modules;
    first and second backwash pipes configured to supply backwash water to the first and second submerged-type filtration membrane modules;
    a high pressure pump configured to pressurize an initial filtrate with a pressure higher than an osmotic pressure of a feed water, the initial filtrate produced from the feed water by the first and second submerged-type filtration membrane modules;
    a reverse osmosis membrane module configured to filter the initial filtrate pressurized by the high pressure pump;
    a first valve configured to selectively connect the first submerged-type filtration membrane module to one of the common suction pump and the first backwash pipe; and
    a second valve configured to selectively connect the second submerged-type filtration membrane module to one of the common suction pump and the second backwash pipe,
    wherein the initial filtrate is fed directly from the first and second submerged-type filtration membrane modules to the reverse osmosis membrane module without being stored therebetween.

2. The filtration system of claim 1, wherein the reverse osmosis membrane module comprises:
    a condensed water outlet configured to discharge a condensed water produced as the initial filtrate is filtered by the reverse osmosis membrane module, and
    wherein the condensed water outlet is connected to the first and second backwash pipes such that the condensed water is used as the backwash water.

3. The filtration system of claim 2, further comprising a control unit configured to control the common suction pump in such a manner that a flux of the initial filtrate to be pressurized by the high pressure pump can be maintained constant.

4. The filtration system of claim 3, further comprising a flowmeter configured to measure the flux of the initial filtrate to be pressurized by the high pressure pump and supply the measured flux to the control unit.

5. The filtration system of claim 1, further comprising a flux distributing valve configured to supply a portion of the initial filtrate produced by the first and second submerged-type filtration membrane modules to the first and second backwash pipes and a rest of the initial filtrate to the high pressure pump.

6. The filtration system of claim 5, further comprising a control unit configured to control the common suction pump in such a manner that a flux of the initial filtrate to be pressurized by the high pressure pump can be maintained constant.

7. The filtration system of claim 6, further comprising a flowmeter configured to measure the flux of the initial filtrate to be pressurized by the high pressure pump and supply the measured flux to the control unit.

8. A filtration method comprising:
    performing a preliminary filtration of a feed water with first and second submerged-type filtration membrane modules;
    pressurizing an initial filtrate produced through the preliminary filtration with a pressure higher than an osmotic pressure of the feed water;
    filtering the pressurized initial filtrate with a reverse osmosis membrane module, the initial filtrate being fed directly from the first and second submerged-type filtration membrane modules to the reverse osmosis membrane module without being stored therebetween;
    interrupting the first submerged-type filtration membrane module performing the preliminary filtration; and
    backwashing the first submerged-type filtration membrane module caused to stop performing the preliminary filtration,
    wherein the preliminary filtration with the second submerged-type filtration membrane module is continuously performed while the first submerged-type filtration membrane module is backwashed.

9. The filtration method of claim 8, wherein the filtering with the reverse osmosis membrane module is continuously performed while the first submerged-type filtration membrane module is backwashed.

10. The filtration method of claim 9, further comprising adjusting a flux of the initial filtrate in such a manner that the flux of the initial filtrate to be pressurized with the pressure higher than the osmotic pressure can be maintained constant.

11. The filtration method of claim 10, further comprising, before adjusting the flux of the initial filtrate, measuring the flux of the initial filtrate to be pressurized with the pressure higher than the osmotic pressure.

12. The filtration method of claim 8, wherein the first submerged-type filtration membrane module is backwashed with a portion of the initial filtrate produced by the second submerged-type filtration membrane module.

13. The filtration method of claim 12, further comprising adjusting a flux of the initial filtrate in such a manner that the flux of the initial filtrate to be pressurized with the pressure higher than the osmotic pressure can be maintained constant.

14. The filtration method of claim 13, further comprising, before adjusting the flux of the initial filtrate, measuring the flux of the initial filtrate to be pressurized with the pressure higher than the osmotic pressure.

15. The filtration method of claim 8, wherein the backwashing is performed with a condensed water produced as a result of the filtration of the pressurized initial filtrate by the reverse osmosis membrane module.

* * * * *